United States Patent
Boopalachandran et al.

(10) Patent No.: US 12,403,670 B2
(45) Date of Patent: Sep. 2, 2025

(54) ZEOLITE CONTAINING POLYOLEFINS FILMS

(71) Applicant: Dow Global Technologies LLC, Midland, MI (US)

(72) Inventors: Praveenkumar Boopalachandran, Rosharon, TX (US); Daniel G. Abebe, Lake Jackson, TX (US); Kefu Sun, Sugar Land, TX (US); Scott T. Matteucci, Midland, MI (US); Paul Cookson, Cheadle (GB); Beata A. Kilos, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 64 days.

(21) Appl. No.: 18/567,978

(22) PCT Filed: Sep. 19, 2021

(86) PCT No.: PCT/US2021/050162
§ 371 (c)(1),
(2) Date: Dec. 7, 2023

(87) PCT Pub. No.: WO2023/043426
PCT Pub. Date: Mar. 23, 2023

(65) Prior Publication Data
US 2024/0262597 A1  Aug. 8, 2024

(51) Int. Cl.
| | |
|---|---|
| *B32B 5/18* | (2006.01) |
| *B01D 53/04* | (2006.01) |
| *B32B 27/32* | (2006.01) |
| *C08K 3/36* | (2006.01) |

(52) U.S. Cl.
CPC ............. *B32B 5/18* (2013.01); *B32B 27/32* (2013.01); *B32B 27/327* (2013.01); *C08K 3/36* (2013.01); *B01D 53/04* (2013.01); *B01D 2253/1085* (2013.01); *B01D 2257/708* (2013.01); *B01D 2257/90* (2013.01); *B32B 2250/02* (2013.01); *B32B 2250/24* (2013.01); *B32B 2264/1021* (2020.08); *B32B 2264/1023* (2020.08); *B32B 2264/302* (2020.08); *B32B 2264/303* (2020.08); *B32B 2266/0278* (2013.01); *B32B 2270/00* (2013.01); *B32B 2307/758* (2013.01); *B32B 2439/46* (2013.01); *C08L 2203/16* (2013.01); *C08L 2207/066* (2013.01)

(58) Field of Classification Search
CPC ......... B32B 5/18; B32B 27/32; B32B 27/327; B32B 2250/02; B32B 2250/24; B32B 2264/1021; B32B 2264/1023; B32B 2264/302; B32B 2264/303; B32B 2266/0278; B32B 2270/00; B32B 2307/758; B32B 2439/46; B32B 27/08; B32B 27/20; B32B 2323/046; C08K 3/36; C08K 3/34; B01D 53/04; B01D 2253/1085; B01D 2257/708; B01D 2257/90; B01D 53/02; C08L 2203/16; C08L 2207/066; C08L 2205/02; B01J 20/183; B01J 20/262; B01J 20/28026; B01J 20/28033; B01J 20/28045; B01J 20/3007; B01J 20/261; C08G 18/165; C08G 18/1833; C08G 18/2063; C08G 18/242; C08G 18/3275; C08G 18/4072; C08G 18/4816; C08G 18/4837; C08G 18/4883; C08G 18/632; C08G 18/6688; C08G 18/7621; C08G 2110/0008; C08G 2110/005; C08G 2110/0083; C08G 18/14; C08G 2101/00; C08J 2323/06; C08J 2323/08; C08J 5/18; B65D 81/267; Y02P 20/143; Y02W 30/62

See application file for complete search history.

(56) References Cited

U.S. PATENT DOCUMENTS

| | | |
|---|---|---|
| 3,645,992 A | 2/1972 | Elston |
| 3,914,342 A | 10/1975 | Mitchell |
| 4,076,698 A | 2/1978 | Anderson et al. |
| 4,599,392 A | 7/1986 | McKinney et al. |
| 4,795,482 A | 1/1989 | Gioffre et al. |
| 5,272,236 A | 12/1993 | Lai et al. |
| 5,582,923 A | 12/1996 | Kale et al. |
| 5,733,155 A | 3/1998 | Sagawa et al. |
| 5,854,045 A | 12/1998 | Fang et al. |
| 7,582,142 B2 | 9/2009 | Schultink et al. |
| 2010/0300905 A1 | 12/2010 | Speer et al. |
| 2017/0349716 A1 | 12/2017 | Zhu et al. |
| 2021/0040296 A1* | 2/2021 | Takeuchi .............. C08L 23/06 |
| 2023/0272150 A1* | 8/2023 | Boopalachandran .... C08K 3/34 521/82 |
| 2024/0052126 A1* | 2/2024 | Challa .................. G06V 10/82 |
| 2025/0111534 A9* | 4/2025 | Challa .................. G06V 20/56 |

FOREIGN PATENT DOCUMENTS

| | | |
|---|---|---|
| DE | 19508946 | 8/1999 |
| JP | 2007175892 A * | 7/2007 |
| TW | 201332594 | 8/2013 |
| WO | 2001036518 | 5/2001 |
| WO | 2013053555 | 4/2013 |
| WO | 2016181132 | 11/2016 |
| WO | 2018189519 | 10/2018 |

* cited by examiner

*Primary Examiner* — John D Freeman

(57) ABSTRACT

A method for producing zeolite embedded polyolefin films for packaging polyurethane foams also embedded with zeolite.

15 Claims, No Drawings

ZEOLITE CONTAINING POLYOLEFINS FILMS

FIELD

The present disclosure relates to the use of a high silica zeolites in the packaging of foams. More particularly, the present disclosure relates to the production and use of a zeolite containing polyolefin film composition used to package polyurethane (PUR) foams, wherein the foams also contain zeolites.

INTRODUCTION

Polyurethane materials can be manufactured in a wide range of densities (6 to 1220 kg/m3), and stiffness (flexible elastomers to rigid, hard plastics). These materials find widespread use in many high-performance applications. One of the advantages of polyurethanes is the ability to control the final product properties through fine-tuning of the processing conditions since the polymer is usually formed into a final product during the polymerization reaction. This final product, the polyurethane polymer, is formed between an isocyanate and polyol.

Major polyurethane markets such as flexible foams have stringent mechanical performance targets such as load-bearing capacity and resiliency. Additionally, a degree of comfort, haptics and protection are equally as important for the end-user. Another important property which has been long sought after is low odor and low volatile chemical content. Emission of volatile molecules in the end product can have both regulatory and quality considerations, therefore polyurethane products with minimal volatile content (VOCs) are highly desirable.

Volatile and odor causing molecules in polyurethane systems can originate from unreacted monomers or by-product molecules formed from the alkoxylation reaction used to manufacture polyols. Typically, these unwanted volatiles are removed post alkoxylation though time consuming and uneconomical stripping methods. However, current stripping methods are not able to remove residual volatile molecules in a cost-effective manner.

SUMMARY

A purpose of the present disclosure is to provide a composition for producing zeolites in plastic film used to package polyurethane (PU) foams. Zeolites embedded in a polyolefin film can adsorb and remove odor causing volatile compounds (VOCs) released from packaged PU foam, resulting in a low odor or even odor free composition. This packaging approach can be applied during shipment to consumers or during storage of a foam product in a warehouse. This approach allows PU foams to be manufactured without any changes to foaming formulation as it removes odorous volatiles post fabrication.

It was surprisingly found that high silica zeolites with low affinity for H2O molecules have a tremendous selectivity for nonpolar and polar organic molecules. These zeolites are able to physically adsorb small organic molecules in the presence of H2O. At normal operating conditions, the hydrophobic nature of these high silica zeolites prevents displacement of adsorbed odor causing VOC molecules by H2O molecules. Compared to other commercially available zeolites, these high silica alternatives show significant reduction in odor causing VOC molecules at relatively low loading levels.

Another purpose of the present disclosure is to provide a composition for producing polyisocyanurate (PIR) and polyurethane (PUR) foams, a process for preparing PUR foams, and a novel high silica zeolite additive for preparing PUR foams, and foams made therewith.

The incorporation of said zeolites into a PU foam results in a low odor or odor free composition. In one embodiment, the flexible polyurethane foam produced has a decrease in total aldehyde content by greater than 80% (less than 10 ppm) compared to foams produced via currently known methods. Another embodiment achieves a decrease in total odor causing VOC content by greater than 50% as compared to traditional production methods in addition to or in place of the decreased aldehyde content. In both these embodiments, there is no change in mechanical and physical properties of the resulting foam as compared to traditional production methods. The zeolites can be used to mitigate odor causing VOC molecules for both open and closed cell foams and similar results in reduction of odor causing VOCs were found when using the zeolites in the polyolefin packaging film of a PU foam.

Additionally, due to inert nature of these zeolites, there is minimal impact on mechanical and physical properties of the resulting foams and/or films when incorporated during production. This enables production and packaging of flexible, low odor foams used for automotive applications, mattresses, pillows, furniture, and other consumer comfort applications.

The zeolites may be added to the polyol component, foaming formulation, and/or the polyolefin film within which a formed PU foam is stored. The use of the zeolites in this manner can virtually eliminate the detectable odors emitted by a PU foam.

It is to be understood that both the foregoing general description and the following detailed description are exemplary and explanatory only and are not restrictive of the claims.

DETAILED DESCRIPTION

Unless defined otherwise, all technical and scientific terms used herein have the same meaning as commonly understood by one of ordinary skill in the art to which the method belongs. Also, all publications, patent applications, patents, and other references mentioned herein are incorporated by reference. As disclosed herein, the term "composition", "formulation" or "mixture" refers to a physical blend of different components, which is obtained by mixing simply different components by a physical means. As disclosed herein, "and/or" means "and, or as an alternative". All ranges include endpoints unless otherwise indicated.

I. Polyolefin Films

Disclosed in various embodiments herein are polyolefin films. The polyolefin films may be described as shrink films which comprise a monolayer or multi-layer film having at least one layer comprising a formulated resin; wherein the formulated resin comprises: a (i) a low density polyethylene (LDPE) wherein the LDPE has a density of from 0.915 g/cc to 0.925 g/cc and melt index, I2, of from 0.1 g/10 min to 1 g/10 min, or (ii) a linear low density polyethylene (LLDPE) wherein the LLDPE has a density of from 0.915 g/cc to 0.945 g/cc and melt index, I2, from 0.1 g/10 min to 1 g/10 min, or (iii) a combination of (i) and (ii), and a high silica zeolite with a Si/Al molar ratio of greater than 35.

Also disclosed herein are methods of manufacturing shrink films. The methods comprise providing a formulated resin and forming a monolayer or multilayer film from the formulation resin.

Also disclosed herein are multilayer shrink films. The multilayer shrink films comprise a core layer and two skin layers, wherein the skin layers include high optics skin layers, and wherein the core layer comprises a formulated resin. The formulated resin comprises: (i) a low density polyethylene (LDPE) wherein the LDPE has a density of from 0.915 g/cc to 0.925 g/cc and melt index, I2, of from 0.1 g/10 min to 1 g/10 min, or (ii) a linear low density polyethylene (LLDPE) wherein the LLDPE has a density of from 0.915 g/cc to 0.945 g/cc and melt index, I2, from 0.1 g/10 min to 1 g/10 min, or (iii) a combination of (i) and (ii), and a high silica zeolite with a Si/Al molar ratio of greater than 35.

As used herein, the term "polyethylene" or "ethylene-based polymer" shall mean polymers comprising greater than 50% by mole of units which have been derived from ethylene monomer. This includes polyethylene homopolymers or copolymers (meaning units derived from two or more comonomers). Common forms of polyethylene known in the art include low density polyethylene (LDPE); linear low density polyethylene (LLDPE); medium density polyethylene (MDPE); and high density polyethylene (HDPE).

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392). LDPE resins typically have a density in the range of 0.915 to 0.935 g/cm.

The term "LLDPE" includes resin made using Ziegler-Natta catalyst systems as well as resin made using single-site catalysts, including, but not limited to, bis-metallocene catalysts (sometimes referred to as "m-LLDPE") and constrained geometry catalysts, and resin made using post-metallocene, molecular catalysts. LLDPE includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236; 5,278,272; 5,582,923; and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPE resins can be made via gas-phase, solution-phase or slurry polymerization or any combination thereof, using any type of reactor or reactor configuration known in the art.

The term "MDPE" refers to polyethylenes having densities from 0.926 g/cc to 0.945 g/cc. "MDPE" is typically made using chromium or Ziegler-Natta catalysts or using single-site catalysts including, but not limited to, bis-metallocene catalysts and constrained geometry catalysts.

The term "HDPE" refers to polyethylenes having densities greater than 0.945 g/cc, which are generally prepared with Ziegler-Natta catalysts, chrome catalysts or single-site catalysts including, but not limited to, bis-metallocene catalysts and constrained geometry catalysts.

The term "post-consumer recycled resin" (or "PCR resin"), as used herein, refers to a polymeric material, including blends of polymers, recovered from materials previously used in a consumer or industry application, as defined by ISO-14021. The generic term post-consumer recycled resin thus includes blends of polymers recovered from materials generated by households or by commercial, industrial, and institutional facilities in their role as end-users of the material, which can no longer be used for its intended purpose. The generic term post-consumer recycled resin also includes blends of polymers recovered from returns of materials from the distribution chain. PCR resin is often collected from recycling programs and recycling plants. The PCR resin may include one or more of a polyethylene, a polypropylene, a polyester, a poly(vinyl chloride), a polystyrene, an acrylonitrile butadiene styrene, a polyamide, an ethylene vinyl alcohol, an ethylene vinyl acetate, or a poly-vinyl chloride. The PCR resin may include one or more contaminants. The contaminants may be the result of the polymeric material's use prior to being repurposed for reuse. For example, contaminants may include paper, ink, food residue, or other recycled materials in addition to the polymer, which may result from the recycling process.

PCR resin is distinct from virgin polymeric material. A virgin polymeric material does not include materials previously used in a consumer or industry application. Virgin polymeric material has not undergone, or otherwise has not been subject to, a heat process or a molding process other than the polymer synthesis process or pelletization, like a typical PCR resin. The physical, chemical, and flow properties of PCR resins differ when compared to virgin polymeric resin, which in turn can present challenges to incorporating PCR resin into formulations for commercial use.

PCR resin is typically polyolefin, and polyethylene in particular. PCR may be sourced from HDPE packaging such as bottles (milk jugs, juice containers), LDPE/LLDPE packaging such as films. PCR also includes residue from its original use, residue such as paper, adhesive, ink, nylon, ethylene vinyl alcohol (EVOH), polyethylene terephthalate (PET), and other odor-causing agents. Sources of PCR resin can include, for example, bottle caps and closures, milk, water or orange juice containers, detergent bottles, office automation equipment (printers, computers, copiers, etc.), white goods (refrigerators, washing machines, etc.), consumer electronics (televisions, video cassette recorders, stereos, etc.), automotive shredder residue (the mixed materials remaining after most of the metals have been sorted from shredded automobiles and other metal-rich products "shredded" by metal recyclers), packaging waste, household waste, rotomolded parts (kayaks/coolers), building waste and industrial molding and extrusion scrap.

In embodiments, the polyolefin in the PCR resin can be any polyolefin found in recycled streams. For example, high-density polyethylene (HDPE), low-density polyethylene (LDPE), linear low-density polyethylene (LLDPE), MDPE, ULDPE, polypropylene (PP), functionalized polyolefins and combinations of two or more of the preceding polymers.

In embodiments, the PCR resin further comprises residue from its original use, such as paper, adhesive, ink, nylon, ethylene vinyl alcohol (EVOH), polyamide (PA), polyethylene terephthalate (PET), and other organic or inorganic material.

In embodiments, the PCR resin comprises at least 50 weight percent (wt. %) or at least 60 weight percent, or at least 70 weight percent, or at least 75 weight percent, or at least 80 weight percent, or at least 85 weight percent, or at least 90 weight percent, or at least 95 weight percent, of a polyolefin based on total weight of the post-consumer recycled resin. In embodiments, the PCR resin can comprise up to 99.9 weight percent, or up to 99.5 weight percent, or up to 99 weight percent, or up to 98 weight percent, or up to 97 weight percent, or up to 96 weight percent, or up to 95 weight percent, or up to 90 weight percent, of polyolefin based on total weight of the post-consumer recycled resin.

The term "odor-active zeolite" refers to a zeolite that is an odor control agent, for example due to its capacity to absorb and/or adsorb odorous liquids and gases, thereby neutralizing odors. A description of such zeolites can be found below under the zeolite heading in this disclosure.

As used throughout this specification, the abbreviations given below have the following meanings, unless the context clearly indicates otherwise: "=" means "equal to"; "@" means "at"; "<" means "less than"; ">" means "greater than"; "$I_2$" means "melt index" measured at 2.16 kg and 190° C.; g=gram(s); mg=milligram(s); pts=parts by weight; kg=kilogram(s); Kg/h=kilograms per hour; g/cc=gram(s) per cubic centimeter; kg/m$^3$=kilogram(s) per cubic meter; g/mol=gram(s) per mole; L=liter(s); mL=milliliter(s); g/L=gram(s) per liter; Mw=weight average molecular weight; Mn=number average molecular weight; Mz=z-average molecular weight; m=meter(s); µm=micron(s): mm=millimeter(s); cm=centimeter(s); min=minute(s); s=second(s); mm/s$^2$=millimeter(s) per second squared; mm/s=millimeter(s) per second; ms=millisecond(s); hr=hour(s); mm/min=millimeter(s) per minute; m/s=meter(s) per second; ° C.=degree(s) Celsius; ° C./min=degree(s) Celsius per minute; mPa·s=millipascals-second(s); MPa=Megapascal(s); kPa=kilopascal(s); Pa·s/m$^2$=pascals-second(s) per meter squared; N=newton(s); cN=centinewton(s); rpm=revolution(s) per minute; mm$^2$=millimeter(s) squared; g/10 min=gram(s) per 10 minutes; J=Joule(s); J/g=Joule(s) per gram; %=percent; eq %=equivalent percent; vol %=volume percent; and wt %=weight percent.

Unless stated otherwise, all percentages, parts, ratios, and like amounts, are defined by weight. For example, all percentages stated herein are weight percentages (wt %), unless otherwise indicated. Temperatures are in degrees Celsius (° C.), and "ambient temperature" means between 20° C. and 25° C., unless specified otherwise.

In one or more embodiments, the present invention relates to a shrink film having at least one layer comprising a formulated resin. In embodiments herein, the at least one layer may comprise at least 50 wt. %, at least 75 wt. %, at least 80 wt. %, at least 85 wt. %, at least 90 wt. %, at least 95 wt. %, at least 97 wt. %, at least 99 wt. %, or 100 wt. % of the formulated resin. The shrink film may be a fully recyclable mono-material PE structure without any barrier layer(s) added to the film PE product structure.

As previously noted herein, the formulated resin comprises at least a (i) a low density polyethylene (LDPE), or (ii) a linear low density polyethylene (LLDPE), or (iii) a combination of (i) and (ii) and a zeolite additive. In one or more embodiments herein, the formulated resin comprises from 20 weight percent to 100 weight percent (alternatively, from a lower limit of 30, 35, 40, 50, or 60 weight percent to an upper limit of 100, 90, 80, or 75 weight percent) of the post-consumer recycled resin. In some embodiments, the formulated resin comprises from 30 weight percent to 100 weight percent, from 35 weight percent to 100 weight percent, from 35 weight percent to 90 weight percent, or from 40 weight percent to 80 weight percent of the post-consumer recycled resin. In addition to the amount of post-consumer recycled resin in the formulated resin, in one or more embodiments herein, the formulated resin concentration of component (i) is from 0 weight percent to 60 weight percent, or alternatively, from 5 weight percent to 60 weight percent, from 5 weight percent to 50 weight percent, from 5 weight percent to 40 weight percent, from 5 weight percent to 30 weight percent, or from 10 weight percent to 30 weight percent. In addition to the amount of post-consumer recycled resin and component (i) in the formulated resin, in one or more embodiments herein, the formulated resin concentration of component (ii) is from 0 weight percent to 60 weight percent, or alternatively, from 10 weight percent to 60 weight percent, from 25 weight percent to 60 weight percent, from 30 weight percent to 60 weight percent, from 30 weight percent to 50 weight percent, or from 35 weight percent to 50 weight percent. In some embodiments, the formulated resin comprises LDPE in the amounts previously mentioned. In other embodiments, the formulated resin comprises LLDPE in the amounts previously mentioned. In further embodiments, the formulated resin comprises LDPE, and LLDPE in the amounts previously mentioned.

Examples of suitable LDPEs can include commercially available resins, such as, for example, LDPE 150E available from The Dow Chemical Company or LDPE 310E available from The Dow Chemical Company.

In embodiments herein, the LLDPE has a density of from 0.915 g/cc to 0.945 g/cc and a melt index, $I_2$, from 0.1 g/10 min to 1 g/10 min. All individual values and subranges of are included and disclosed herein. For example, in some embodiments, the LLDPE has a density of from 0.915 g/cc to 0.945 g/cc (alternatively, 0.915 g/cc to 0.940 g/cc, 0.915 g/cc to 0.938 g/cc, or 0.917 g/cc to 0.938 g/cc), and a melt index, $I_2$, of from 0.1 g/10 min to 1 g/10 min (alternatively, from 0.1 g/10 min to 1.0 g/10 min, from 0.1 g/10 min to 0.8 g/10 min, from 0.1 g/10 min to 0.6 g/10 min, from 0.1 g/10 min to 0.5 g/10 min, or from 0.1 g/10 min to 0.4 g/10 min).

Examples of suitable LLDPEs can include commercially available compounds such as TUFLIN™, DOWLEX™, DOWLEX™ NG, and ELITE™ resins (all available from The Dow Chemical Company) and mixtures thereof; ENABLE™ and EXCEED™ resins (both available from ExxonMobil) and mixtures thereof; LUMICENE™ and SUPERTOUGH™ resins (both available from Total) and mixtures thereof; and two or more of the above resins in a blend. Specific examples of suitable LLDPEs may include, for example, DOWLEX™ 2045G resin, DOWLEX™ 2049G resin, DOWLEX™ 2098P resin, DOWLEX™ 2038.68G resin, DOWLEX™ 2645G resin and DOWLEX™ NG 5045P resin (all available from The Dow Chemical Company) and mixtures thereof.

In embodiments described herein, the formulated resin may have a density of 0.925 g/cc to 0.960 g/cc. All individual values and subranges of at least 0.925 g/cc to 0.960 g/cc are included and disclosed herein. For example, in some embodiments, the formulated resin has a density of from 0.925 g/cm$^3$ to 0.955 g/cm$^3$, 0.930 g/cm$^3$ to 0.955 g/cm$^3$, 0.935 g/cm$^3$ to 0.955 g/cm$^3$, or 0.935 g/cm$^3$ to 0.950 g/cm$^3$. Density may be measured in accordance with ASTM D792.

In addition to the density, the formulated resin may have a molecular weight distribution (Mw/Mn) of from 2.0 to 10.0. All individual values and subranges of from 2.0 to 10.0 are included and disclosed herein. For example, in some embodiments, the formulated resin may have an Mw/Mn ratio from a lower limit of 2.5, 3.0, 3.5, 4.0, 4.5, 5.0, 5.5, or 6.0 to an upper limit of 10.0, 9.5, 9.0, 8.5, or 8.0. In other embodiments, the formulated resin may have an Mw/Mn ratio of from 5.0 to 10.0. In further embodiments, the formulated resin may have an Mw/Mn ratio of from 6.0 to 9.0. In further embodiments, the formulated resin may have an Mw/Mn ratio of from 6.0 to 8.5. Molecular weight distribution can be described as the ratio of weight average molecular weight ($M_w$) to number average molecular weight ($M_n$) (i.e., $M_w/M_n$), and can be measured by gel permeation chromatography techniques.

In addition to the density and molecular weight distribution, the formulated resin may have a melt index, I2, of 0.1 g/10 min to 1.0 g/10 min. All individual values and subranges of 0.1 g/10 min to 1.0 g/10 min are included and disclosed herein. For example, in some embodiments, the polyethylene composition may have a melt index, I2, of from 0.1 g/10 min to 0.8 g/10 min, from 0.1 g/10 min to 0.6 g/10 min, from 0.1 g/10 min to 0.5 g/10 min, or from 0.1 g/10 min to 0.4 g/10 min. Melt index, I2, may be measured in accordance with ASTM D1238 (190° C. and 2.16 kg).

In addition to the density, molecular weight distribution, and melt index, I2, the formulated resin may have a melt flow ratio, I10/I2, of from 10.0 to 25.0. All individual values and subranges of from 10.0 to 25.0 are included and disclosed herein. For example, in some embodiments, the formulated resin may have a melt flow ratio, I10/I2, ranging from a lower limit of 10.0, 12.0, or 14.0 to an upper limit of 25.0, 23.0, or 22.0. In one or more embodiments, the formulated resin may have a melt flow ratio, I10/I2, of from 12.0 to 25.0, from 14.0 to 23.0, or from 14.0 to 22.0. Melt index, I10, may be measured in accordance with ASTM D1238 (190° C. and 10.0 kg).

In addition to the density, molecular weight distribution, melt index, I2, and melt flow ratio, I10/I2, the formulated resin may have a melt flow ratio, I21/I2, of from 25 to 200. All individual values and subranges of from 25 to 200 are included and disclosed herein. For example, in some embodiments, the formulated resin may have a melt flow ratio, I21/I2, ranging from a lower limit of 25, 30, 40, or 50 to an upper limit of 200, 175, 150, 125, 110, or 90. In one or more embodiments, the formulated resin may have a melt flow ratio, I21/I2, of from 40 to 150, from 40 to 125, or from 50 to 110. Melt index, I21, may be measured in accordance with ASTM D1238 (190° C. and 21.6 kg).

In addition to the density, molecular weight distribution, melt index, I2, melt flow ratio, I10/I2, and I21/I2, the formulated resin may have a number average molecular weight, Mn (g/mol), of from 10,000 to 50,000 g/mol. All individual values and subranges of from 10,000 to 50,000 g/mol are included and disclosed herein. For example, the formulated resin may have a Mn from 12,000 to 50,000 g/mol, 12,000 to 45,000 g/mol, 12,000 to 30,000 g/mol, or 12,000 to 27,000 g/mol.

In addition to the density, molecular weight distribution, melt index, I2, melt flow ratio, I10/I2, I21/I2, and number average molecular weight, the formulated resin may have a weight average molecular weight, Mw (g/mol), of from 80,000 to 200,000 g/mol. All individual values and subranges of from 80,000 to 200,000 g/mol are included and disclosed herein. For example, the formulated resin may have a Mw from 95,000 to 185,000 g/mol, 100,000 to 175,000 g/mol, or 110,000 to 170,000 g/mol.

In addition to the density, molecular weight distribution, melt index, I2, melt flow ratio, I10/I2, I21/I2, number average molecular weight, and weight average molecular weight, the formulated resin may have a z average molecular weight, Mz (g/mol), of from 300,000 to 1,000,000 g/mol. All individual values and subranges of from 300,000 to 1,000,000 g/mol are included and disclosed herein. For example, the formulated resin may have an Mz from 350,000 to 950,000, 400,000 to 900,000 g/mol, or 500,000 to 900,000 g/mol.

In addition to the density, molecular weight distribution, melt index, I2, melt flow ratio, I10/I2, I21/I2, number average molecular weight, weight average molecular weight, and z average molecular weight, the formulated resin may have an Mz/Mw of from 3 to 10. All individual values and subranges of from 3 to 10 are included and disclosed herein. For example, in some embodiments, the formulated resin may have an Mz/Mw of from a lower limit of 3, 3.0, 3.5, or 4.0 to an upper limit of 10, 10.0, 9.0, 8.5, 8.0, 7.5, 7.0, or 6.5. In other embodiments, the formulated resin may have an Mz/Mw ratio of from 3.0 to 9.0, from 3.0 to 8.0, from 3.0 to 7.5, or from 3.5 to 6.5. Mz can be measured by gel permeation chromatography techniques.

In addition to the density, molecular weight distribution, melt index, I2, melt flow ratio, I10/I2, I21/I2, number average molecular weight, weight average molecular weight, z average molecular weight, and Mz/Mw, the formulated resin may have a melt strength of from 0.03 to 0.25 N. All individual values and subranges of from 0.03 to 0.25 N are included and disclosed herein. For example, in some embodiments, the formulated resin may have a melt strength of from 0.05 to 0.20 N or from 0.06 to 0.17 N.

In embodiments herein, the formulation resin may include one or more additives. The additives in combination with the composition of the present invention may be formulated to enable performance of specific functions while maintaining the excellent benefits/properties of the formulation resin. For example, the following additives may be blended with the formulation resin include: zeolites (see zeolite section below for more details), antioxidants, pigments, colorants, UV stabilizers, UV absorbers, processing aids, fillers, slip agents, anti-blocking agents, and the like; and mixtures thereof.

The additives, when used in the formulated resin, can be present in an amount generally in the range of from 0 wt % to 10 wt % in one embodiment; from about 0.001 wt % to 5 wt % in another embodiment; and from 0.001 wt % to 3 wt % in still another embodiment. In other embodiments the optional additive may be added to the formulated resin in an amount of less than 5 wt % in one general embodiment, less than 3 wt % in another embodiment, and less than 1 wt % in still another embodiment.

The shrink film may be a monolayer film or a multilayer film. In one or more embodiments herein, the multilayer film has at least one layer comprising the formulated resin. In other embodiments, the multilayer film has at least three layers, with at least one layer comprising the formulated resin. In further embodiments, the multilayer film comprises a core layer and two skin layers, wherein one skin layer (of the two skin layers) is on each side of the core layer, and the core layer comprises the formulated resin. The core layer may comprise at least 50 wt. %, at least 75 wt. %, at least 80 wt. %, at least 85 wt. %, at least 90 wt. %, at least 95 wt. %, at least 97 wt. %, at least 99 wt. %, or 100 wt. % of the formulated resin.

A process for making the formulated resin includes, for example, mixing together components (a), (b) and (c) described above; and any desired optional additive. Mixing may be achieved using a dry blend process or a melt blend process, both of which are well-known processes to those skilled in the art of mixing. In some embodiments, the formulated resin is a melt blend formulated resin.

In one or more embodiments, the shrink monolayer or multilayer film may have any desired length and width; and has a thickness of, for example, from 30 microns to 120 microns. All individual values and subranges of from 30 microns to 120 microns are included and disclosed herein. For example, in some embodiments, the shrink monolayer or multilayer film may have a thickness of 30 microns to 100 microns, from 30 microns to 90 microns, or from 30 microns to 80 microns.

Also disclosed herein are methods of manufacturing the shrink films. The methods comprise providing a formulated resin as described in one or more embodiments herein, and forming a monolayer or multilayer film from the formulation resin. Any conventional film forming process may be used to form the monolayer or multilayer film. An example includes a blown film line (for example, a blow line manufactured by Battenfeld Gloucester) using typical fabrication parameters easily determined by those skilled in the art of producing blown films.

In some embodiments, the shrink film may be a multilayer shrink film having an A/B/A film structure can be prepared, wherein each A is a skin layer of the same material; and B is the core layer disposed in between the skin layers A, or an A/B/C film structure wherein A and C are skin layers having a different material composition, and B is the core layer disposed between the skin layers A and C. In both embodiments, the B core layer comprises the formulated resin as described herein. The shrink film can have a 1:2:1 ratio of the skin layers and the core layer, respectively. Each skin layer used in the present invention film may independently have a thickness of from 8 μm to 30 μm in one embodiment, from 10 μm to 25 μm in another embodiment, or from 12 μm to 20 μm in still another embodiment. The core layer used in the present invention film may have a thickness of, for example, from 20 μm to 60 μm in one embodiment, from 25 μm to 55 μm in another embodiment, or from 30 μm to 50 μm in still another embodiment. The present invention is not limited to 3 layers, and can include more than 3 layers, provided that at least one core or inner layer of the multilayer shrink film comprises the formulated resin and still allows for the proper balance of properties, such as, stiffness, toughness, and shrinkage.

Each of the skin layers of a multilayer shrink film comprise one or more ethylene-based polymeric materials, including, for example, HDPE, LDPE, MDPE, LLDPE and mixtures thereof. In one or more embodiments, the skin layers useful in the present invention may independently comprise HDPE, LDPE, LLDPE, and mixtures thereof. In some embodiments, each skin layer independently comprises LDPE, LLDPE and HDPE, wherein the LDPE has a density of from 0.915 g/cc to 0.925 g/cc and a melt index, $I_2$, of from 0.2 g/10 min to 2.0 g/10 min, the LLDPE has a density of from 0.915 g/cc to 0.940 g/cc and a melt index, $I_2$, of from 0.2 g/10 min to 2.0 g/10 min, and the HDPE has a density of from 0.945 g/cc to 0.965 g/cc and a melt index, $I_2$, of from 0.04 g/10 min to 1.0 g/10 min. In other embodiments, each skin layer independently comprises LDPE and LLDPE, wherein the LDPE has a density of from 0.915 g/cc to 0.925 g/cc and a melt index, $I_2$, of from 0.1 g/10 min to 2.0 g/10 min, and the LLDPE has a density of from 0.915 g/cc to 0.940 g/cc and a melt index, $I_2$, of from 0.2 g/10 min to 2.0 g/10 min.

In one or more embodiments herein, the shrink film may exhibit one or more of the following properties: an tensile strength of from 20 MPa to 40 MPa, as measured by ASTM D882; an MD shrinkage of from 40 percent to 70 percent (alternatively, from 45 percent to 70 percent or from 50 percent to 70 percent) and an TD shrinkage from 10 percent to 50 percent (alternatively, from 12 percent to 50 percent or from 15 percent to 50 percent), as measured by ASTM D2732-03 at 130° C. and 20 seconds; a haze of from 5 percent to 50 percent (alternatively, 5 percent to 30 percent or 5 percent to 20 percent), as measured by ASTM D1003. In addition to the tensile strength, shrinkage, and haze properties, the shrink films described herein may also exhibit an improvement in toughness, which is quantified in the range of higher than 70 g on dart impact (A) (60 micron film) in one embodiment; higher than 75 g on dart impact (A) (60 micron film) in another embodiment; and higher than 80 g on dart impact (A) (60 micron film) in still another embodiment.

The monolayer or multilayer shrink film as described herein can be used, for example, in packaging applications. In one or more embodiments, articles are packaged using the monolayer or multilayer shrink films described herein.

II. Polyurethane Foaming Formulation

In various embodiments, a composition for producing flexible polyurethane (PUR) foams is provided, comprising an isocyanate, an isocyanate-reactive component including one or more polyols that can react with the isocyanate groups, a blowing agent, and at least one zeolite additive. Amines and organometallic catalysts may also be included. Without being bound by theory, the isocyanate component and the isocyanate-reactive component are generally stored in separate containers until the moment when they are blended together and subjected to the polymerization reaction between the isocyanate groups and hydroxyl groups to form polyisocyanurate and polyurethane. Polyurethane refers to a polymer comprising a main chain formed by the repeating unit (—NH—C(O)—O—) derived from the reaction between isocyanate group and hydroxyl group.

As used herein, the terms of "polyisocyanurate and polyurethane", "polyisocyanurate or polyurethane", "PIR and PUR", "PIR or PUR" and "PIR/PUR" are used interchangeably and refer to a polymeric system comprising both polyurethane chain and polyisocyanurate groups, with the relative proportions thereof basically depend on the stoichiometric ratio of the polyisocyanate compounds and polyol compounds contained in the raw materials. Besides, the ingredients, such as catalysts and other additives, and processing conditions, such as temperature, reaction duration, etc., may also slightly influence the relative amounts of the PUR and PIR in the final foam product. Therefore, polyisocyanurate and polyurethane foam (PIR/PUR foam) as stated in the context of the present disclosure refer to foam obtained as a product of the reaction between the above indicated polyisocyanates and compounds having isocyanate-reactive groups, particularly, polyols. Besides, additional functional groups, e.g. allophanates, biurets or ureas may be formed during the reaction. The PIR/PUR foam may be a rigid foam or flexible foam. The composition of the present disclosure may further comprise catalyst, blowing agent, and other additives.

According to one broad embodiment of the present disclosure, a foam-forming composition and method of making rigid polyurethane foams for the foam-forming composition comprises three components: an isocyanate component comprising at least one polyisocyanate compound, an isocyanate-reactive component comprising at least one or more polyols, and the high silica containing zeolite.

The high silica zeolite may be introduced into the foaming formulation (and resulting foam) in a number of ways. These include mixing the zeolite into the polyol component of the foaming formulation right before the foaming process. Zeolites may also be added into the foaming formulation directly as a powder. The powdered mode of addition could be used in formulated polyol systems for pillows, car seats (premixing of the formulated polyol will be needed, standard practice in systems for discontinuous processes). The powdered mode of addition could be used in box foamer formulations (premixing with the polyol is needed). The powdered modes of addition above rely on stable powdered zeolites, but unstable powdered zeolites could also be used. These unstable powdered zeolites require mixing before and after addition to the polyol. Powdered zeolites can also be added into the polyol for use as a component in flex slab continuous machine production where no premixing is possible.

The zeolites may also be added by any other functionally capable method which enables the zeolites to be embedded upon and/or within the foaming formulation or formed foam. For example, liquid and/or powdered zeolites may be fed as a separate stream into the forming formulation when its components are mixed (e.g., polyol, iscocyante, and zeolite streams mixed at the same time). The zeolite may also be laid down on a substrate (poured, sprinkled, etc.) and the foaming formulation poured upon the zeolite with out mixing or in addition to mixing. The zeolite may also be poured, sprinkled, or otherwise applied to foaming formulation (or rising foam) after the formulation is mixed and poured onto a substrate.

Additionally, other optionally auxiliary components such as surfactant, catalyst, additional blowing agent, flame retardant additive, etc. may be pre-mixed into the isocyanate-reactive component or the isocyanate component, which is then mixed with the other components to produce the PU foam or admixed into the foam-forming composition as separate streams for the foam production. Not all of these optional auxiliary components are required for the foam production and should not be read as limiting the scope of this disclosure in any way.

Various embodiments of the presently disclosed composition may vary in the amounts, contents or concentration of the isocyanate-reactive component and the isocyanate component. The isocyanate component in these embodiments are calculated based on the total weight of the foam-forming composition, i.e. combined weight of the isocyanate-reactive component, the isocyanate component, the zeolite, and all optional auxiliary components if not already accounted for in another component.

Isocyanate Component

In various embodiments, the isocyanate component of the foam-forming composition of the present invention, can include, for example, one or more isocyanate compounds including for example a polyisocyanate. As used herein, "polyisocyanate" refers to a molecule having an average of greater than 1.0 isocyanate (NCO) groups per molecule, e.g. an average NCO functionality of greater than 1.0.

The isocyanate compound useful in the present invention may be an aliphatic polyisocyanate, a cycloaliphatic polyisocyanate, an araliphatic polyisocyanate, an aromatic polyisocyanate, or combinations thereof. Examples of isocyanates useful in the present invention include, but are not limited to, polymethylene polyphenylisocyanate; toluene 2,4-/2,6-diisocyanate (TDI); methylenediphenyl diisocyanate (MDI); polymeric MDI; triisocyanatononane (TIN); naphthyl diisocyanate (NDI); 4,4'-diisocyanatodicyclohexyl-methane; 3-isocyanatomethyl-3,3,5-trimethylcyclohexyl isocyanate (isophorone diisocyanate IPDI); tetramethylene diisocyanate; hexamethylene diisocyanate (HDI); 2-methyl-pentamethylene diisocyanate; 2,2,4-trimethylhexamethylene diisocyanate (THDI); dodecamethylene diisocyanate; 1,4-diisocyanatocyclohexane; 4,4'-diisocyanato-3, 3'-dimethyl-dicyclohexylmethane; 4,4'-diisocyanato-2,2-dicyclohexylpropane; 3-isocyanatomethyl-1-methyl-1-isocyanatocyclohexane (MCI); 1,3-diisooctylcyanato-4-methylcyclohexane; 1,3-diisocyanato-2-methylcyclohexane; and combinations thereof, among others. In addition to the isocyanates mentioned above, partially modified polyisocyanates including uretdione, isocyanurate, carbodiimide, uretoneimine, allophanate or biuret structure, and combinations thereof, among others, may be utilized in the present invention.

The isocyanate compound may be polymeric. As used herein "polymeric", in describing the isocyanate, refers to high molecular weight homologues and/or isomers. For instance, polymeric methylene diphenyl isocyanate refers to a high molecular weight homologue and/or an isomer of methylene diphenyl isocyanate.

The isocyanate compound useful in the present invention may be modified multifunctional isocyanates, that is, products which are obtained through chemical reactions of an isocyanate compound. Exemplary are polyisocyanates containing esters, ureas, biurets, allophanates and carbodiimides and/or uretoneimines. Liquid polyisocyanates containing carbodiimide groups, uretoneimines groups and/or isocyanurate rings, having isocyanate groups (NCO) contents of from 10 to 35 weight percent, from 10 to 32 weight percent, from 10 to 30 weight percent, from 15 to 30 weight percent, or from 15 to 28 weight percent can also be used. These include, for example, polyisocyanates based on 4,4'-, 2,4'- and/or 2,2'-diphenylmethane diisocyanate and the corresponding isomeric mixtures, 2,4- and/or 2,6-toluenediisocyanate and the corresponding isomeric mixtures; mixtures of diphenylmethane diisocyanates and PMDI; and mixtures of toluene diisocyanates and PMDI and/or diphenylmethane diisocyanates.

Alternatively, or additionally, the isocyanate component may also comprise an isocyanate prepolymer. The isocyanate prepolymer is known in the art; and in general, is prepared by reacting (1) at least one isocyanate compound and (2) at least one polyol compound. The isocyanate prepolymer can be obtained by reacting the above stated monomeric isocyanate compounds or polymeric isocyanate with one or more isocyanate reactive compounds such as ethylene glycol, 1,2-propanediol, 1,3-propanediol, 1,3-butanediol, 1,4-butenediol, 1,4-butynediol, 1,5-pentanediol, neopentylglycol, bis(hydroxy-methyl) cyclohexanes such as 1,4bis(hydroxymethyl)cyclohexane, 2-methylpropane-1,3-diol, methylpentanediols, diethylene glycol, triethylene glycol, tetraethylene glycol, polyethylene glycol, dipropylene glycol, polypropylene glycol, dibutylene glycol and polybutylene glycols.

Suitable prepolymers for use as the polyisocyanate component are prepolymers having NCO group contents of from 5 to 30 weight percent or preferably from 10 to 30 weight percent. These prepolymers may be prepared by reaction of the di- and/or poly-isocyanates with materials including lower molecular weight diols and triols. Individual examples are aromatic polyisocyanates containing urethane groups, having NCO contents of from 5 to 30 weight percent (e.g., 10 to 30 or 15 to 30 weight percent) obtained by reaction of diisocyanates and/or polyisocyanates with, for example, lower molecular weight diols, triols, oxyalkylene glycols, dioxyalkylene glycols, or polyoxyalkylene glycols having molecular weights up to about 1000. These polyols can be employed individually or in mixtures as di- and/or polyoxyalkylene glycols. For example, diethylene glycols, dipropylene glycols, polyoxyethylene glycols, ethylene glycols, propylene glycols, butylene glycols, polyoxypropylene glycols and polyoxypropylene-polyoxyethylene glycols can be used. Polyester polyols can also be used, as well as alkane diols such as butane diol. Other diols also useful include bishydroxyethyl- or bishydroxypropyl-bisphenol A, cyclohexane dimethanol, and bishydroxyethyl hydroquinone. In one preferred embodiment, a combination of PMDI/TDI may be used as the isocyanate component.

As aforementioned, the isocyanate may have an average functionality of greater than 1.0 isocyanate groups/molecule. For instance, the isocyanate may have an average functionality of from 1.75 to 3.50. All individual values and subranges from 1.75 to 3.50 are included; for example, the isocyanate may have an average functionality from a lower limit of 1.5, 1.75, 1.85, or 1.95 to an upper limit of 3.5, 3.4, 3.3, 3.2, 3.1 or 3.

The isocyanate may have an isocyanate equivalent weight of from 80 g/eq to 300 g/eq. All individual values and subranges from 80 g/eq to 300 g/eq are included; for example, the isocyanate may have an isocyanate equivalent weight from a lower limit of 80 g/eq, 90 g/eq, or 100 g/eq to an upper limit of 300 g/eq, 290 g/eq, or 280 g/eq.

The isocyanate used in the present invention may be prepared by a known process. For instance, a polyisocyanate may be prepared by phosgenation of corresponding polyamines with formation of polycarbamoylchlorides and thermolysis thereof to provide the polyisocyanate and hydrogen chloride; or in another embodiment, the polyisocyanate may be prepared by a phosgene-free process, such as by reacting the corresponding polyamines with urea and alcohol to give polycarbamates, and thermolysis thereof to give the polyisocyanate and alcohol, for example.

The isocyanate used in the present invention may be obtained commercially. Examples of commercial isocyanates useful in the present invention include, but are not limited to, polyisocyanates under the trade names VORANATE™, PAPI™, and ISONATE™, such as VORANATE™ M 220, and PAPI™ 27, all of which are available from Dow, Inc., among other commercial isocyanates such as VORANATE™ T-80, PAPI™ 94 or PAPI™ 23.

Generally, the amount of the isocyanate component may vary based on the end use of the rigid PU foam. For example, as one illustrative embodiment, the concentration of the isocyanate component can be from about 20 wt % to about 80 wt %, or from about 25 wt % to about 80 wt %; or from about 30 wt % to about 75 wt %, based on the total weight of all the components in the foam-forming composition for preparing the PU foams. In one embodiment, the stoichiometric ratio of the isocyanate groups in the isocyanate component to the hydroxyl groups in the isocyanate-reactive component is between about 1.0 and 6, resulting in the formed polyurethane and polyisocyanurate foam having an isocyanate index between 70 and 600. The isocyanate index may have a lower limit from 70, 80, 90, 100, 105, 110, 115, 120, 125, 150, 175, and 180 to an upper limit of 600, 575, 550, 525, 500, 475, 450, 425, 400, 375, 350, 325, and 300.

In other embodiments, there are other types of isocyanate which may be used to form more flexible foams. For instance, memory foam made with PMDI has an isocyanate index<100 (around 75).

Isocyanate-Reactive Component

In various embodiments of the present disclosure, the isocyanate-reactive component comprises one or more isocyanate-reactive compounds such as polyols selected from the group consisting of aliphatic polyhydric alcohols comprising at least two hydroxyl groups, cycloaliphatic or aromatic polyhydric alcohols comprising at least two hydroxyl groups, aralphatic polyhydric alcohols comprising at least two hydroxyl groups, polyether polyol, polycarbonate polyol, polyester polyol, polyesterether polyol and mixture thereof. In one example, the polyol is selected from the group consisting of C2-C16 aliphatic polyhydric alcohols comprising at least two hydroxyl groups, C6-C15 cycloaliphatic or aromatic polyhydric alcohols comprising at least two hydroxyl groups, C7-C15 aralphatic polyhydric alcohols comprising at least two hydroxyl groups, and combinations thereof. Polyester polyols generally have an average molecular weight from 200 to 5,000. Polyether polyols have an average molecular weight from 100 to 5,000, In one embodiment, the isocyanate-reactive component comprises a mixture of two or more different polyols, such as a mixture of two or more polyether polyols, a mixture of two or more polyester polyols, or a mixture of at least one polyether polyols with at least one polyester polyols. The isocyanate-reactive component has a functionality (average number of isocyanate-reactive groups, particularly, hydroxyl group, in a polyol molecule) of at least 1.8 and a OH number of 80 to 2,000 mg KOH/g. The OH number of isocyanate-reactive component is preferably from 100 to 1,500 mg KOH/g, more from preferably 120 to 1,000 mg KOH/g, even more preferably from 150 to 750 mg KOH/g, yet even more preferably from 150 to 750 mg KOH/g, and yet even still more preferably from 150 to 500 mg KOH/g.

In general, the average hydroxyl functionality of the polyol compound useful in the present invention, such as those described above, can range from a low as 1.8 to as high as 7.5. For example, the aromatic polyester polyol may have an average hydroxyl functionality from 1.8 to 3.0; and the sucrose/glycerine-initiated polyether polyol may have an average hydroxyl functionality of from 3.0 to 7.5. Therefore, the average hydroxyl functionality of the polyol compound used in the present invention can range from 1.8 to 7.5. All individual values and subranges from 1.8 to 7.5 are included; for example, the polyol compound may have an average hydroxyl functionality from a lower limit of 1.8, 2.0, 2.2, 2.5, 2.7, 3.0, or 3.5 to an upper limit of 7.5, 7.0, 6.5, 6.0, 5.7, 5.5, 5.2, 5.0, 4.8, 4.5, 4.2, or 4.0.

In general, the polyol compound may have an average hydroxyl number ranging from 75 mg KOH/g to 650 mg KOH/g. All individual values and subranges from 75 mg KOH/g to 650 mg KOH/g are included; for example, the polyol compound may have an average hydroxyl number from a lower limit of 75 mg KOH/g, 80 mg KOH/g, 100 mg KOH/g, 125 mg KOH/g, 150 mg KOH/g, or 175 mg KOH/g to an upper limit of 650 mg KOH/g, 600 mg KOH/g, 550 mg KOH/g, 500 mg KOH/g, 450 mg KOH/g, or 400 mg KOH/g.

In general, the polyol compound may have a number average molecular weight of from 100 g/mol to 1,500 g/mol. All individual values and subranges of from 100 g/mol to 1,500 g/mol are included; for example, the polyol compound may have a number average molecular weight from a lower limit of 100 g/mol, 150 g/mol, 175 g/mol, or 200 g/mol to an upper limit of 1,500 g/mol, 1250 g/mol, 1,000 g/mol, or 900 g/mol.

In general, the polyol compound may have a hydroxyl equivalent molecular weight from 50 g/eq to 750 g/eq. All individual values and subranges from 50 g/eq to 750 g/eq are included; for example, the polyol compound may have a hydroxyl equivalent molecular weight from a lower limit of 50 g/eq, 90 g/eq, 100 g/eq, or 110 g/eq to an upper limit of 350 g/eq, 300 g/eq, 275 g/eq, or 250 g/eq.

The polyester polyol is typically obtained by condensation of polyhydric alcohols with polyfunctional carboxylic acids having from 2 to 12 carbon atoms (e.g., 2 to 6 carbon atoms). Typical polyhydric alcohols for preparing the polyester polyol are diols or triols and include ethylene glycol, diethylene glycol, polyethylene glycol such as PEG 200, propylene glycol, dipropylene glycol, polypropylene glycol, butylene glycol, pentylene glycol or hexylene glycol, polyether polyol, glycerol, etc. Typical polyfunctional carboxylic acids are selected from the group consisting of succinic acid, glutaric acid, adipic acid, suberic acid, azelaic acid, sebacic acid, decanedicarboxylic acid, maleic acid, fumaric acid and phthalic acid, isophthalic acid, terephthalic acid, the isomeric naphthalenedicarboxylic acids, and combinations thereof. The average OH functionality of a polyester polyol is preferably at least 1.8, even more preferably at least 2.0. Aromatic polyester polyols are one common type of polyester polyols used in rigid polyurethane foam.

As used herein "aromatic polyester polyol" refers to a polyester polyol including an aromatic ring. As an example, the aromatic polyester polyol may be phthalic anhydride diethylene glycol polyester or may be prepared from the use of aromatic dicarboxylic acid with glycols. The aromatic polyester polyol may be a hybrid polyester-polyether polyol, e.g., as discussed in International Publication No. WO 2013/053555.

Aromatic polyester polyol may be prepared using known equipment and reaction conditions. In another embodiment, the aromatic polyester polyol may be obtained commercially. Examples of commercially available aromatic polyester polyols include, but are not limited to, a number of polyols sold under the trade name STEPANPOL™, such as STEPANPOL™ PS-2352, available from Stepan Company, among others.

The polyether polyols usually have a hydroxyl functionality between 2 and 8, in particular from 2 to 6 and is generally prepared by polymerization of one or more alkylene oxides selected from propylene oxide (PO), ethylene oxide (EO), butylene oxide, tetrahydrofuran and mixtures thereof, with a proper starter molecule or a mixture of multiple starter molecules in the presence of catalyst. Typical starter molecules include compounds having at least two hydroxyl groups or have at least one primary amine group in the molecule. Suitable starter molecules can be ethylene glycol, glycerol, trimethylolprpane, pentaerythritol, castor oil, sugar compounds such as, glucose, sorbitol, mannitol and sucrose, aliphatic amines, and aromatic amines, polyhydric phenols, resols, such as oligomeric condensation products of phenol and formaldehyde and Mannich condensates of phenols, formaldehyde and dialkanolamines, and also melamine, etc.

By way of starter molecules having at least 2 (e.g., from 2 to 8) hydroxyl groups in the molecule, it is possible to further use the following non-limiting examples: trimethylolpropane, glycerol, pentaerythritol, castor oil, sugar compounds such as, glucose, sorbitol, mannitol and sucrose, polyhydric phenols, resols, such as oligomeric condensation products of phenol and formaldehyde and Mannich condensates of phenols, formaldehyde and dialkanolamines, and also melamine. Catalyst for the preparation of polyether polyols may include alkaline catalysts, such as potassium hydroxide, for anionic polymerization or Lewis acid catalysts, such as boron trifluoride, for cationic polymerization. Suitable polymerization catalysts may include potassium hydroxide, cesium hydroxide, boron trifluoride, or a double cyanide complex (DMC) catalyst such as zinc hexacyanocobaltate or quaternary phosphazenium compound. In an embodiment of the present disclosure, the polyether polyol has a number average molecular weight in the range from 100 to 2,000 g/mol. For example, in the range from 125 to 1,500 g/mol, from 150 to 1,250 g/mol from 150 to 1,000 g/mol or from 200 to 1,000 g/mol.

A polyether polyol suitable for use in an embodiment may have an average hydroxyl functionality of 2.0, commonly referred as a diol. The diol may be ethylene glycol, propylene glycol, an ethoxylate of ethylene glycol or propylene glycol, a propyloxylate of ethylene glycol or propylene glycol, etc. Examples of commercially available diols include, but are not limited to, a number of polyols sold under the trade name VORANOL™, such as VORANOL™ 2110-TB, available from The Dow Chemical Company, among others. These others may include, but are not limited to: VORANOL™ 8136, VORANOL™ 3943A, VORALUX™ HL 431, VORALUX™ HN 395, VORANOL™ WK 3140, VORANOL™ 8150, VORANOL™ 4053, VORANOL™ 1447, etc. could be used.

A polyether polyol suitable for use in an embodiment may have an average hydroxyl functionality of 3.0, commonly referred as a triol. The triol may be a glycerol, a trimethylolpropane, an ethoxylate or propyloxylate of glycerol or trimethylolprpane, etc. The triol may be prepared using known equipment and reaction conditions. Examples of commercially available triols include, but are not limited to, a number of polyols sold under the trade name VORATEC™, such as VORATEC™ SD 301, available from The Dow Chemical Company, among others.

A polyether polyol suitable for use in this invention may include a sucrose/glycerine-initiated polyether polyol. The sucrose/glycerine-initiated polyether polyol may include structural units derived from another alkylene oxide, e.g., ethylene oxide or propylene oxide. The sucrose/glycerine-initiated polyether polyol may include structural units derived from styrene-acrylonitrile, polyisocyanate, and/or polyurea. The sucrose/glycerine-initiated polyether polyol may be prepared using known equipment and reaction conditions. For instance, the sucrose/glycerine-initiated polyether polyol may be formed from reaction mixtures including sucrose, propylene oxide, and glycerin. One or more embodiments provide that the sucrose/glycerine-initiated polyether polyol is formed via a reaction of sucrose and propylene oxide. In another embodiment, the sucrose/glycerine-initiated polyether polyol may be obtained commercially. Examples of commercially available sucrose/glycerine-initiated polyether polyols include, but are not limited to, a number of polyols sold under the trade name VORANOL™, such as VORANOL™ 360, VORANOL™ 490, and VORANOL™ 280 available from The Dow Chemical Company (Dow, Inc.), among others.

A polyether polyol suitable for use in this invention may include a sorbitol-initiated polyether polyol. The sorbitol-initiated polyether polyol may be prepared using known equipment and reaction conditions. For instance, the sorbitol-initiated polyether polyol may be formed from reaction mixtures including sorbitol and alkylene oxides, e.g., ethylene oxide, propylene oxide, and/or butylene oxide. The sorbitol-initiated polyether polyol may be capped, e.g., the addition of the alkylene oxide may be staged to preferentially locate or cap a particular alkylene oxide in a desired position of the polyol. Sorbitol-initiated polyether polyols may be obtained commercially. Examples of commercially available sorbitol-initiated polyether polyols include, but are not limited to, a number of polyols sold under the trade name VORANOL™ such as VORANOL™ RN 482, available from The Dow Chemical Company, among others.

A polyether polyol suitable for use in this invention may include polyol compounds that include an amine-initiated polyol. The amine-initiated polyol may be initiated from aromatic amine or aliphatic amine, for example, the amine-initiated polyol may be an ortho toluene diamine (o-TDA) initiated polyol, an ethylenediamine initiated polyol, a diethylenetriamine, triisopropanolamine initiated polyol, or a combination thereof, among others. Amine-initiated polyols may be prepared using known equipment and reaction conditions. For instance, the amine-initiated polyol may be formed from reaction mixtures including aromatic amines or aliphatic amines and alkylene oxides, e.g., ethylene oxide and/or butylene oxide, among others. The alkylene oxides may be added into an alkoxylation reactor in one step or via several steps in sequence, wherein in each step, a single alkylene oxide or a mixture of alkylene oxides may be used.

The polyol may be prepared with the following non-limiting examples of catalyst: KOH, T121 (tert-amyl peroxy-2-ethylhexanoate), or a Lewis acid polymerization catalyst. The polyol may also include volatile molecules including but not limited to: low molecular weight aldehydes, ketones, aromatics (e.g., styrenics, benzene derivatives), nitriles, dioxolane, dioxane, amines, thiols and mixtures thereof.

The Lewis acid catalyst may have the general formula M(R1)1(R2)1(R3)1(R4)0 or 1, whereas M is boron, aluminum, indium, bismuth or erbium, R1, R2, R3, and R4 are each independent, R1 includes a first fluoroalkyl-substituted phenyl group, R2 incudes a second fluoroalkyl-substituted phenyl group or a first fluoro/chloro-substituted phenyl group, R3 includes a third fluoroalkyl-substituted phenyl group or a second fluoro/chloro-substituted phenyl group, and optional R4 includes a functional group or functional polymer group, R1 being different from at least one of R2 and R3. The method further includes forming a polyether polyol having a number average molecular weight of greater than the number average molecular weight of the low molecular weight initiator in the presence of the Lewis acid catalyst.

In general, the amount of polyols used herein may range from about 10 wt % to about 80 wt %, or from about 12 wt % to 70 wt %, or from about 15 wt % to 60 wt % or from about 15 wt % to about 55 wt %, or from about 15 wt % to about 50 wt %, based on the total weight of all components in the foam-forming composition for preparing the PUR/PIR foam.

Optional Auxiliary Components

In addition to the above at least one isocyanate-reactive component, at least one isocyanate component, and at least one zeolite additive present in the foam-forming composition for the production of polyurethane/polyisocyanurate foam, the foam-forming composition of the present invention may also include other additional optional auxiliary components, compounds, agents or additives. Such optional component(s) may be added to the reactive mixture with any of the other components in the foam-forming composition (e.g., isocyanate component, isocyanate-reactive component, zeolite additive) or added as a separate stream during the foam production.

The optional auxiliary components, compounds, agents or additives that can be used in the present invention can include one or more optional compounds known in the art for their use or function. For example, the optional components can include as methylene chloride, acetone, water, chain extenders, crosslinkers, expandable graphite, additional physical or chemical blowing agent that may be same or different from the aforementioned blowing agent, foaming catalyst, flame retardant, emulsifier, antioxidant, surfactant, compatibilizing agent, chain-extender, other liquid nucleating agents, solid nucleating agents, Ostwald ripening inhibitors additives, pigment, fillers, solvents including further a solvent selected from the group consisting of ethyl acetate, methyl ether ketone, toluene, and mixtures of two or more thereof; and mixtures of two or more of the above optional additives.

The amount of optional auxiliary compound used to add to the foam-forming composition of the present invention can be, for example, from 0 pts to 50 pts, based on 100 pts of total polyols amount in the isocyanate-reactive component in one embodiment, from 0.1 to 40 pts in another embodiment and from 1 pts to 35 pts in still another embodiment. For example, in one embodiment, the usage amount of additional physical blowing agent, when used, can be from 1 pts to 40 pts, based on 100 pts of total polyols amount in the isocyanate-reactive component. In another embodiment, the usage amount of additional chemical blowing agent, when used, can be from 0.1 pts to 10 pts, based on 100 pts of total polyols amount in the isocyanate-reactive component. In still another embodiment, the usage amount of a flame-retardant additive, when used, can be from 1 pts to 25 pts, based on 100 pts of total polyols amount in the isocyanate-reactive component. In yet another embodiment, the usage amount of a surfactant, when used, is typically from 0.1 pts to 10 pts, based on 100 pts of total polyols amount in the isocyanate-reactive component. In even still another embodiment, the usage amount of a foaming catalyst, when used, is from 0.05 pts to 5 pts, based on 100 pts of total polyols amount in the isocyanate-reactive component. And, in a general embodiment, the usage amount of other additives, when used, can be from 0.1 pts to 10 pts, based on 100 pts of total polyols amount in the isocyanate-reactive component.

Catalyst

Catalyst may include urethane reaction catalyst and isocyanate trimerization reaction catalyst. Trimerization catalysts may be any trimerization catalyst known in the art that will catalyze the trimerization of an organic isocyanate compound. Trimerization of isocyanates may yield polyisocyanurate compounds inside the polyurethane foam. Without being limited to theory, the polyisocyanurate compounds may make the polyurethane foam more rigid and provide improved reaction to fire. Trimerization catalysts can include, for example, glycine salts, tertiary amine trimerization catalysts, alkali metal carboxylic acid salts, and mixtures thereof. In some embodiments, sodium N-2-hydroxy-5-nonylphenyl-methyl-N-methylglycinate may be employed. When used, the trimerization catalyst may be present in an amount of 0.05-5 pts (e.g., 0.1-3.5 pts, or 0.2-2.5 pts, or 0.5-2.5 pts), based on 100 pts of total polyols amount in the isocyanate-reactive component.

Tertiary amine catalysts include organic compounds that contain at least one tertiary nitrogen atom and are capable of catalyzing the hydroxyl/isocyanate reaction between the isocyanate component and the isocyanate-reactive component. Tertiary amine catalysts can include, by way of example and not limitation, triethylenediamine, tetramethylethylenediamine, pentamethyldiethylene triamine, bis(2-dimethylaminoethyl)ether, triethylamine, tripropylamine, tributylamine, triamylamine, pyridine, quinoline, dimethylpiperazine, piperazine, N-ethylmorpholine, 2-methylpropanediamine, methyltriethylenediamine, 2,4,6-tridimethylamino-methyl)phenol, N, N', N"-tris(dimethyl aminopropyl)sym-hexahydrotriazine, and mixtures thereof. When used, the tertiary amine catalyst may be present in an amount of 0.05-5 pts (e.g., 0.1-3.5 pts, or 0.2-2.5 pts, or 0.5-2.5 pts), based on 100 pts of total polyols amount in the isocyanate-reactive component.

The composition of the present disclosure may further comprise the following catalysts: tertiary phosphines, such as trialkylphosphines and dialkylbenzylphosphines; chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni; acidic metal salts of strong acids such as ferric chloride, stannic chloride; salts of organic acids with variety of metals, such as alkali metals, alkaline earth metals, Al, Sn, Pb, Mn, Co, Ni and Cu; organotin compounds, such as tin(II) salts of organic carboxylic acids, e.g., tin(II) diacetate, tin(II) dioctanoate, tin(II) diethylhexanoate, and tin(II) dilaurate, and dialkyltin(IV) salts of organic carboxylic acids, e.g., dibutyltin diacetate, dibutyltin dilaurate, dibutyltin maleate and dioctyltin diacetate; bismuth salts of organic carboxylic acids, e.g., bismuth octanoate; organometallic derivatives of trivalent and pentavalent As, Sb and Bi and metal carbonyls of iron and cobalt. The total amount of the catalyst component used herein may range generally from about 0.01 pts to about 10 pts in the polyol package in one embodiment, and from 0.05 pts to about 5 pts), based on 100 pts of total polyols amount in the isocyanate-reactive component.

Surfactant

The foam-forming composition of the present invention may include a surfactant, e.g., the surfactant may be added to any one of the components in the foam-forming composition or added as a separate stream during the foam production. The surfactant may be a cell-stabilizing surfactant. Examples of surfactants useful in the present invention include silicon-based compounds such as organosilicone-polyether copolymers, such as polydimethylsiloxane-polyoxyalkylene block copolymers, e.g., polyether modified polydimethyl siloxane, and combinations thereof. Surfactants are available commercially and include those available under trade names such as NIAXT™, such as NIAX™ L 6988; and TEGOSTAB™, such as TEGOSTAB™ B 8462; among others. Examples of surfactants also include non-silicone based organic surfactants such as VORASURF™ 504 and VORASURF™ DC 5043, available from The Dow Chemical Company.

Other surfactants that may be useful herein are polyethylene glycol ethers of long-chain alcohols, tertiary amine or alkanolamine salts of long-chain allyl acid sulfate esters, alkylsulfonic esters, alkyl arylsulfonic acids, and combinations thereof. Such surfactants are employed in amounts sufficient to stabilize the foaming reaction against collapse and the formation of large uneven cells. The amount of surfactant, when used, may be from 0.1 pts to 10.0 based upon 100 pts of total polyols present in the isocyanate-reactive component. All individual values and subranges from 0.1 pts to 10.0 pts are included; for example, the surfactant may be from a lower limit of 0.1 pts, 0.2 pts, or 0.3 pts to an upper limit of 10.0 pts, 9.0 pts, 7.5, or 6 pts, based upon 100 pts of total polyols present in the isocyanate-reactive component.

Blowing Agent

A variety of conventional blowing agents can be used. For example, the blowing agent can be one or more of water, various hydrocarbons, various hydrofluorocarbons, various hydrofluoroolefins, formic acid, noble gases, a variety of chemical blowing agents that produce nitrogen or carbon dioxide under the conditions of the foaming reaction, and the like; and a mixture thereof.

The blowing agent for use in this invention should have a boiling point at atmospheric pressure of from about −30° C. to about 100° C., preferably a boiling point of from about −20° C. to about 80° C., more preferably a boiling point of from about 0° C. to about 80° C., even more preferably a boiling point of from about 5° C. to about 75° C., and most preferably a boiling point of from about 10° C. to about 70° C. Illustrative examples of blowing agents that can be used in the invention include low-boiling hydrocarbons such as heptane, hexane, n- and iso-pentane, technical grade mixtures of n- and isopentanes and n- and iso-butane and propane, cycloalkanes such as cyclopentane and/or cyclohexane, low-boiling ethers such as furan, dimethyl ether and diethyl ether, low-boiling ketones such as acetone and methyl ethyl ketone, alkyl carboxylates, such as methyl formate, dimethyl oxalate and ethylene lactate, various hydrochlorofluorocarbons (HCFCs), hydrofluorocarbons (HFCs) and hydrofluoroolefins (HFOs) such as 1, 1-dichloro-2,2,2-trifluoroethane, 2,2-dichloro-2-fluoroethane, pentafluoropropane, heptafluoropropane, hexafluorobutene, (E,Z) 1,1,1,4,4,4-hexafluoro-2-butene and trans-1 chloro-,3,3,3-trifluoropropene, trans-1,3,3,3-tetrafluoroprop-1-ene, 1,3,3,3-tetrafluoropropene, etc. Some of these blowing agents are commercially available materials known as Solstice® LBA, Solstice® GBA, Opteon™ 1100, Opteon™ 1150, etc. Mixtures of these low boiling liquids with each other and/or with other substituted or unsubstituted hydrocarbons can also be used.

In one embodiment, the at least one blowing agent of the invention is selected from the group consisting of aliphatic hydrocarbons having 3 to 7 carbon atoms, cycloaliphatic hydrocarbons having 3 to 7 carbon atoms, and hydrofluoroolefin, or a mixture thereof.

In various embodiments, a blowing agent may be selected based at least in part on the desired density of the final foam. The blowing agent may be added to the polyol side before the isocyanate-reactive component is combined with the isocyanate component or added as a separate stream. The amount of blowing agent is from about 0.1 pts to about 40 pts (e.g., from about 0.5 pts to about 35 pts, from 1 pts to 30 pts, or from 5 pts to 25 pts) based on 100 pts of total polyols amount in the foam-forming composition.

In various embodiments, the foam-forming composition of the present invention may include an additional blowing agent that may be same or different from Component (C). The additional blowing agent may be incorporated to any one of the two components (A) and (B) prior to the foam production or added as a separate stream and mixed online with Components (A), (B), (C), and (D) during the foam production. The additional blowing agent may be selected based at least in part on the desired density of the final foam.

A variety of conventional blowing agents can be used. For example, the blowing agent can be one or more of water, various hydrocarbons, various hydrofluorocarbons, various hydrofluoroolefins, formic acid, noble gases, a variety of chemical blowing agents that produce nitrogen or carbon dioxide under the conditions of the foaming reaction, and the like; and mixtures thereof. Methylene chloride or acetone are sometimes also used.

The chemical blowing agent such as water can be used alone or mixed with other chemical and/or physical blowing agents. Also suitable as chemical blowing agents are organic carboxylic acids such as formic acid, acetic acid, oxalic acid, and carboxyl-containing compounds.

Physical blowing agents can be used such as low-boiling hydrocarbons. Examples of such used liquids are alkanes, such as heptane, hexane, n- and iso-pentane, technical grade mixtures of n- and isopentanes and n- and iso-butane and propane, cycloalkanes such as cyclopentane and/or cyclohexane, ethers, such as furan, dimethyl ether and diethyl ether, ketones such as acetone and methyl ethyl ketone, alkyl carboxylates, such as methyl formate, dimethyl oxalate and ethylene lactate and halogenated hydrocarbons such as methylene chloride, dichloromonofluoromethane, difluoromethane, trifluoromethane, difluoroethane, tetrafluoroethane, chlorodifluoroethanes, 1, 1-dichloro-2,2,2-trifluoroethane, 2,2-dichloro-2-fluoroethane, hexafluorobutene, various hydrochlorofluorocarbons (HCFCs), hydrofluorocarbons (HFCs) and hydrofluoroolefins (HFOs) such as 1, 1-dichloro-2,2,2-trifluoroethane, 2,2-dichloro-2-fluoroethane, pentafluoropropane, heptafluoropropane, hexafluorobutene, (E,Z) 1,1,1,4,4,4-hexafluoro-2-butene and trans-1 chloro-,3, 3,3-trifluoropropene, trans-1,3,3,3-tetrafluoroprop-1-ene, 1,3,3,3-tetrafluoropropene, etc. Some of these blowing agents are commercially available materials known as Solstice® LBA, Solstice® GBA, Opteon™ 1100, Opteon™ 1150, etc. Mixtures of these low boiling liquids with each other and/or with other substituted or unsubstituted hydrocarbons can also be used.

In various embodiments, the amount of the additional blowing agent is from about 0.1 pts to about 40 pts (e.g., from about 0.5 pts to about 35 pts, from 1 pts to 30 pts, or from 5 pts to 25 pts) based on 100 pts of total polyols amount in the isocyanate-reactive component.

Other Optional/Auxiliary Additives

Other optional/auxiliary compounds or additives that may be used in the foam-forming composition of the present embodiments for the production of polyurethane foam may include, for example, other co-catalysts, co-surfactants, toughening agents, flow modifiers, adhesion promoters, diluents, stabilizers, plasticizers, dispersing agents, flame retardant (FR) additive, and mixtures thereof.

In various embodiments, fire performance may be enhanced by including one or more flame retardants. Flame retardants may be halogenated or non-halogenated and may include, by way of example and not limitation, tris(1,3-dichloro-2-propyl)phosphate, tris(2-choroethyl)phosphate, tris(2-chloropropyl)phosphate, triethylphosphate, diammonium phosphate, various halogenated aromatic compounds, antimony oxide, alumina trihydrate, and combinations thereof. When used, the flame retardant may be present in an amount from 0.1 pts to about 30 pts, or about 1 pts to 25 pts, or about 2 pts to about 25 pts, or about 5 pts to about 25 pts, based on 100 pts of total polyols amount in the isocyanate-reactive component.

Other additives such as fillers and pigments may be included for the production of the PIR/PUR foams. Such fillers and pigments may include, in non-limiting embodiments, barium sulfate, calcium carbonate, graphite, carbon black, titanium dioxide, iron oxide, microspheres, alumina trihydrate, wollastonite, glass fibers, polyester fibers, other polymeric fibers, combinations thereof, and the like.

III. Zeolites

As used herein, the term "zeolite" refers to microporous crystalline materials with well-defined structures of voids and channels of discrete sizes, and which are predominantly composed of aluminum, silicon, and oxygen (i.e., aluminosilicates) in their regular framework. Zeolites may additionally comprise various cations. Zeolites may be used as adsorbents and catalysts. Zeolites occur naturally, but may also be industrially produced on a large scale. Zeolites have a highly regular, crystal pore structure that have dimensions on a molecular scale. Due to their porosity, zeolites have a molecular sieve property, such that they are capable of sorting molecules based primarily on a size exclusion process. As used herein, the term "odor-active zeolite" refers to a zeolite that is an odor control agent, for example due to its capacity to absorb and/or adsorb odorous liquids and gases, thereby neutralizing odors.

Different zeolite species have different crystalline structures that determine the distribution, shape, and size of the zeolite's pores. Natural zeolites may crystallize in a variety of natural processes, while artificial zeolites may be crystallized, for example, from a silica-alumina gel in the presence of templates and alkalis. There are over 200 known types of zeolite crystal structures. An MFI crystal structure, which may also be referred to as a silicate-1 crystal structure, is a zeolite structure comprising multiple pentasil units connected by oxygen bridges which form pentasil chains, and having the chemical formula: $Na_nAl_nSi_{96-n}O_{192} \cdot 16H_2O$, wherein n is greater than zero and less than 27. A faujasite ("FAU") crystal structure, which may also be referred to a Y-type crystal structure or an IZA crystal structure, is a zeolite crystal structure that consists of sodalite cages which are tetrahedrally connected through hexagonal prisms, and which has a pore formed by a 12-membered ring. In aspects, the composition comprises a zeolite having a mixture of crystal structures, wherein the mixture of crystal structures comprises an MFI crystal structure and an FAU crystal structure.

Zeolites may be classified by the molar ratio of silicon to aluminum ("Si/Al molar ratio") within the zeolite. In embodiments, the composition comprises a zeolite having an Si/Al molar ratio from 1 to 1000. All individual values and subranges of a molar ratio from 1 to 1000 are disclosed and included herein, including from 1 to 100, from 1 to 200, from 1 to 300, from 1 to 400, from 1 to 500, from 1 to 600, from 1 to 700, from 1 to 800, from 1 to 900, from 100 to 1000, from 200 to 1000, from 300 to 1000, from 400 to 1000, from 500 to 1000, from 600 to 1000, from 700 to 1000, from 800 to 1000, or from 900 to 1000. Yet other embodiments may feature Si/Al molar ratio ranges from 35 to 700, 150 to 650, etc.

Zeolites may further be classified by its grain size. The grain size of a zeolite refers to the size of an individual zeolite crystal. In embodiments, the composition may comprise a zeolite having a grain size of from 250 nm to 2000 nm. All individual values and subranges of from 250 nm to 2000 nm are disclosed and included herein; for example, the zeolite can have a grain size of from 250 nm to 2000 nm, from 250 nm to 1000 nm, from 250 nm to 750 nm, from 250 nm to 500 nm, from 500 nm to 2000 nm, from 750 nm to 2000 nm, or from 1000 nm to 2000 nm.

Various commercial embodiments are considered possible for the odor active zeolites. For example, suitable commercial embodiments of the least one odor-active zeolite are Abscents 2000 (ABS 2000) and Abscents 3000 (ABS 3000), which are both commercially available from UOP.

TABLE 1

Zeolite Properties

| Zeolites | Si/Al molar ratio | IZA Crystal Structure | Grain Size (SEM) |
| --- | --- | --- | --- |
| ABS 2000 | 6 | FAU/MFI | ~250 nm to 2000 nm |
| ABS 3000 | 650 | MFI | ~250 nm to 2000 nm |
| CBV 15014G | 150 | MFI | 30-100 nm |
| ZD12041 | 400 | MFI | 30 nm-100 nm |

IV. Method of Film Preparation

Compounding: Samples were compounded in an 11-barrel (44 L/D) Coperion ZSK-26 twin-screw extruder. Extrusion was performed at a screw speed of 200 rpm, a throughput of 20 lb/h and barrel and die temperature set point of 220° C.

Films were prepared using a heated hydraulic press manufactured by Reliable Rubber and Plastics Machinery Company. The heated platens are fourteen inches by fourteen inches. A 14×14 inch chrome plated backing plate was first placed on the bench top. That was covered by a piece of Teflon coated cloth. Approximately 12 grams of polymer was then placed on the Teflon and spread out. Then another piece of Teflon coated cloth was placed over the assembly followed by another chrome plated backing plate. The whole assemble was then placed between the heated platens. The temperature used was 350° F. The platens were then closed without any pressure for 15 seconds. Then the platens were pressured up to 6500 psi. for an additional 15 seconds. The pressure was then released and the assembly was removed from the press and placed on a cool bench top. After cooling the film was then removed from the cavity and the edges trimmed. This procedure produced a film 10×10 inches with a thickness of approximately 0.5 millimeters V. Method of Foam Preparation In various embodiments, the PU foam is prepared by mixing all individual components, including at least one isocyanate-reactive component featuring at least one high silica zeolite, at least one isocyanate component, and any optional auxiliary additives such as catalyst, surfactant, additional blowing agents and any other additives at room temperature or at an elevated temperature of 25 to 200° C. (e.g., from 30 to 90° C. or from 40 to 70° C.) for a duration of 1-20 seconds, followed by an immediate pouring, spraying, injection or lay down of the resulting mixture into a mold cavity or a substrate for foaming. In some embodiments, optional auxiliary additives such as catalysts, flame retardants, additional blowing agent, and surfactants, etc., may be added to the isocyanate-reactive component or the isocyanate component prior to mixing with the other components or admixed with the other components online as separate streams.

In a preferred embodiment, the zeolite was added to the polyol blend and premixed, the isocyanate was then added, and a final mixing was performed to ensure a homogeneous reaction.

Mixing may be performed in a spray apparatus, a mixing head, or a vessel. Immediately after mixing, the foaming mixture may be sprayed or otherwise deposited or injected or poured onto a substrate or into a mold. Irrespective of any particular method of foam fabrication, the amount of the foaming mixture introduced into the mold or onto the substrate is enough to fully fill the mold or take the shape of a panel or any other functional shapes as the foam expands and cures. Some degree of overpacking may even be introduced by using a slight excess amount of the reaction mixture beyond minimally required. For example, the cavity may be overpacked by 5 to 35%, i.e., 5 to 35% by weight more of the reaction system beyond what is minimally required to fill the cavity once the reaction mixture is fully expanded at a pre-determined fabrication condition. This cavity may be optionally kept at atmospheric pressure or partially evacuated to sub-atmospheric pressure.

Upon reacting, the foaming mixture may take the shape of the mold or adheres to the substrate to produce a PU foam which is then allowed to cure, either partially or fully. The foam may also be allowed to rise freely at room temperature. Suitable conditions for promoting the curing of the PU polymer include a temperature of from about 20° C. to about 150° C. In some embodiments, the curing is performed at a temperature of from about 30° C. to about 75° C. In other embodiments, the curing is performed at a temperature of from about 35° C. to about 65° C. In various embodiments, the temperature for curing may be selected at least in part based on the time duration required for the PU polymer to gel and/or cure at that particular temperature. Cure time will also depend on other factors, including, for example, the usage amount of particular components (e.g., type and amount of catalyst), and the size and shape of the article being manufactured. Different articles being produced may include, but is not limited to, consumer comfort goods such as furniture, pillows, mattresses, as well as automotive applications (headliners, car seats, etc.) and any other application in which low odor PU foam may be desirable.

Zeolite Measurements

X-ray powder diffraction patterns (XRD) were acquired on powdered samples using a Bruker D4 diffractometer operated at 40 KV and 40 mA with divergence slits set at 0.20 mm and antiscattering slit set at 0.25 mm. The crystal structure of the zeolites were determined using x-ray diffraction and comparing the diffraction pattern to a public x-ray zeolite database (IZA Zeolite Structure Database).

The Si/Al molar ratio was analyzed using wavelength dispersive x-ray fluorescence under helium using semi-quantitative omnium analysis to calculate the element composition. The grain size of the zeolites was measure using microscopy on a scanning electron microscope (SEM) and measuring the size distribution of the grains present.

The surface areas and pore volumes of the ABSCENTS materials were measured by nitrogen adsorption at 77.4 K using the conventional technique on a Micromeritics ASAP 2420 apparatus. Prior to the adsorption measurements, the samples were degassed in vacuum at 300° C. for at least 3 hours. The pore volumes were determined from the adsorption and desorption branch of isotherms using the Barret-Joyner-Halenda (BJH) procedure. The surface area was calculated using BET method. The Abscents 2000 zeolite has an Si/Al molar ratio of 6, a BET (Brunauer-Emmett-Teller) surface area of 455 $m^2/g$, a pore volume of 0.29 $cm^3/g$, a mixture of FAU and MFI crystal structures, and a grain size of ~250 nm to 2 μm. In some embodiments, useful zeolites have a pore size of pore size of less than 10 Å.

The Abscents 3000 zeolite has an Si/Al molar ratio of 650, a BET (Brunauer-Emmett-Teller) surface area of 344 $m^2/g$, a pore volume of 0.18 $cm^3/g$, an MFI crystal structure, and a grain size of ~250 nm to 2 μm.

Examples

I. Zeolite Film+Zeolite Foam Test

Materials

Silica zeolites were used to evaluate absorption and removal of residual VOC molecules from a formed foam in a separate test than the three above. The zeolites were used as received from supplier and without any additional treatment. Tables 15, 16, and 17 below list the zeolite(s), polymers, and PU foams tested.

The polyolefin films were prepared using a heated hydraulic press manufactured by Reliable Rubber and Plastics Machinery Company. The heated platens are fourteen inches by fourteen inches. A 14×14-inch chrome plated backing plate was first placed on the bench top. That was covered by a piece of Teflon coated cloth. Approximately 12 grams of polymer was then placed on the Teflon and spread out. Zeolites were added in the compounding stage using a twin-screw extruder. The compounded pellets containing zeolite, PCR and Dowlex 2045G virgin resin were then compression molded into these films.

Then another piece of Teflon coated cloth was placed over the assembly followed by another chrome plated backing plate. The whole assemble was then placed between the heated platens. The temperature used was 350° F. The platens were then closed without any pressure for 15 seconds. Then the platens were pressured up to 6500 psi. for an additional 15 seconds. The pressure was then released, and the assembly was removed from the press and placed on a cool bench top. After cooling the film was then removed from the cavity and the edges trimmed. This procedure produced a film 10×10 inches with a thickness of approximately 0.5 millimeters.

To test the films above, polyurethane foams were created. The weights of the various ingredients used in the foaming formulation which created said foam are listed below.

TABLE 2

Foam Formulations

| Type | EW (Equivalent wt.) | Formulation Name PBW of Formulated Polyol Side Polyol Side Components | Ctrl Flex A | Flex C |
|---|---|---|---|---|
| Polyol | 2040 | Polyol 1 | 72.00 | 72.00 |
| Polyol | 1861 | Polyol CPP | 28.00 | 28.00 |
| Polyol | 1795 | Polyol 2 | 1.50 | 1.50 |
| Additive | | DIETHANOLAMINE, 85% | 2.00 | 2.00 |
| Blowing Agent | 9 | DEIONIZED WATER | 2.85 | 2.85 |
| Additive | | VORASURF ™ DC 5043 | 1.15 | 1.15 |
| Catalyst | 101 | DABCO 33LV | 0.10 | 0.10 |
| Catalyst | 226 | Bis(N,N-dimethylaminoethyl)ether (70%) in Dipropylene Glycol | 0.03 | 0.03 |
| Catalyst | | STANNOUS OCTOATE S-26 | 0.07 | 0.07 |
| Zeolite | | ABSCENTS 3000 Conc. (wt %) | | 1.00 |
| | | Isocyante Index | 108 | 108 |
| | | Foam Density (kg/m³) | 36.2 | 35.6 |

Note: Polyol 1 is a glycerine initiated polyol, contains PO and EO (about 14% EO content), EW=2040. Polyol CPP is a grafted polyether polyol containing copolymerized styrene and acrylonitrile, 43% solids content, EW=1861. Polyol 2 is a sucrose-glycerine initiated polyol, contains PO and EO (about 75% EO content), EW=1795. DABCO 33LV is a catalyst, solution of 33% triethylenediamine in 67% dipropylene glycol. TDI is a 80-20 mixture of the 2,4 and 2,6 isomers of toluene diisocyanate.

The foam may be prepared by any means known in the art, including standard box foaming process, which was used to produce free rising foams at room temperature. The first step was to dose and premix in a pouring cup a reactive mixture containing all the polyols, additives, water, silica zeolite, etc. Then add the appropriate amount of TDI to reach the target isocyanate index (108), followed by strong final mixing to incorporate TDI using a high shear pin shape mixer. This reacting mixture was then poured into the wooden box of 15 in×15 in×10 in where the polyurethane foam was let to grow and cure overnight until it was cut for testing of its mechanical properties according to ASTM D 3574.

General Protocol

For a HS-GC experiment a calculated amount of zeolite was melt compounded into blend of PCR (rLDPE NC+505010) and Dowlex 2045G resins at 200° C. at 50/50 blend ratios as shown in the table. 20 mil (~0.5 mm) thick films were fabricated from PCR/Dowlex2045G resins containing zeolites by compression molding (molding conditions are given above). 10.6 g of compression molded films with and without zeolites and 20 g of PU foams with and without zeolites were placed in 32 oz glass jar together. The films were used to loosely surround the PU foams. The film+foam were allowed to sit at room temperature for 3 months before analysis. The headspace gas sample of jars was analyzed for propanal by comprehensive two-dimensional gas chromatography coupled with time of flight mass spectrometer.

TABLE 3

Reduction of Odor Molecules by Zeolite Film and Zeolite Foam in combination as measured by Headspace GC Analysis

| Example | Description | Propanal Peak Area Counts | % Propanal Capture |
|---|---|---|---|
| Comparative Example 6 | PU Foam (0% ABS 3000), No Film | 7117321 | N/A |
| Example 11 | PU Foam (1% ABS 3000), No Film | 1061260 | 85% |
| Example 12 | PU Foam (0% ABS 3000) + PE Film (50/50 rLDPE NC + 505010/Dowlex2045G + 1% ABS 3000) | 4543501 | 36% |
| Example 13 | PU Foam (1% ABS 3000) + PE Film (50/50 rLDPE NC + 505010/Dowlex2045G + 1% ABS 3000) | 793904 | 89% |

As shown, the presence of the PE film embedded with zeolites significantly reduces the amount of volatile compounds (e.g., Propanal) present in the gas headspace and greatly reducing the foam odor. Additionally, the zeolite containing film/zeolite containing foam sample exhibited 26.7% less odor molecules in the headspace compared to the zeolite foam alone. The zeolite containing film/zeolite containing foam sample also showed improvement over the zeolite film alone, demonstrating a synergistic effect.

The invention claimed is:

1. A product comprising:
   (1) a film including:
   a monolayer or multi-layer film having at least one layer comprising a formulated resin; wherein the formulated resin comprises:
   a low density polyethylene (LDPE) wherein the LDPE has a density of from 0.915 g/cc to 0.925 g/cc and a melt index, I2, of from 0.1 g/10 min to 1 g/10 min, or
   a linear low density polyethylene (LLDPE) wherein the LLDPE has a density of from 0.915 g/cc to 0.945 g/cc and a melt index, I2, from 0.1 g/10 min to 1 g/10 min, and
   at least a first silica containing zeolite with a Si/Al molar ratio of greater than 35 and a grain size from grain size of from 250 nm to 2000 nm, and
   (2) a flexible polyurethane foam being the reaction production of an isocyanate component and an isocyanate-reactive component, the flexible polyurethane foam including at least a second silica containing zeolite, the silica containing zeolite having an Si/Al molar ratio of greater than 35 and a grain size of from 250 nm to 2000 nm.

2. The product of claim 1, wherein the formulated resin comprises 30 wt % to 70 wt % post-consumer recycled polymer.

3. The product of claim 1, wherein at least one silica containing zeolite has an Si/Al molar ratio of greater than 500 and less than 700.

4. The product of claim 1, wherein the second silica containing zeolite is present in an amount ranging from 0.1 wt % to 20 wt % of the total isocyanate-reactive composition.

5. The product of claim 1, wherein at least one silica zeolite additive has a pore size of less than 10 Å.

6. The product of claim 1, wherein at least one silica zeolite additive has an Na wt % of less than 2.

7. The product of claim 1, wherein the polyurethane foam is wrapped in the film.

8. The product of claim 1, wherein the polyurethane foam has a density of around 35 kg/m$^3$.

9. A method of packaging a polyurethane foam, comprising:

placing a polyolefin film within packaging of the polyurethane foam, wherein the polyolefin film comprises:

a monolayer or multi-layer film having at least one layer comprising a formulated resin; wherein the formulated resin comprises:

a low density polyethylene (LDPE) wherein the LDPE has a density of from 0.915 g/cc to 0.925 g/cc and a melt index, $I_2$, of from 0.1 g/10 min to 1 g/10 min, or a linear low density polyethylene (LLDPE) wherein the LLDPE has a density of from 0.915 g/cc to 0.945 g/cc and a melt index, $I_2$, from 0.1 g/10 min to 1 g/10 min, and at least a first silica containing zeolite with a Si/Al molar ratio of greater than 35 and a grain size from grain size of from 250 nm to 2000 nm, and wherein the polyurethane foam is comprised of:

at least one isocyanate-reactive component; and at least a second silica containing zeolite, wherein the silica containing zeolite has an Si/Al molar ratio of greater than 35 and a grain size of from 250 nm to 2000 nm.

10. The method of claim 9, wherein the formulated resin comprises 30 wt % to 70 wt % post-consumer recycled polymer.

11. The method of claim 9, wherein at least one silica containing zeolite has an Si/Al molar ratio of greater than 500 and less than 700.

12. The method of claim 9, wherein the second silica zeolite additive is present in an amount ranging from 0.1 wt % to 20 wt % of the total isocyanate-reactive composition.

13. The method of claim 9, wherein at least one zeolite additive has a pore size of less than 10 Å.

14. The method of claim 9, wherein at least one silica containing zeolite has an Na wt % of less than 2.

15. The method of claim 9, wherein the polyurethane foam is wrapped in the film.

* * * * *